(12) United States Patent
Perrin et al.

(10) Patent No.: US 12,448,067 B2
(45) Date of Patent: Oct. 21, 2025

(54) TREAD OF A VEHICLE TRACK

(71) Applicant: COMPAGNIE GENERALE DES ETABLISSEMENTS MICHELIN, Clermont-Ferrand (FR)

(72) Inventors: Frederic Perrin, Clermont-Ferrand (FR); David Dean, Clermont-Ferrand (FR); Maxime Pras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 494 days.

(21) Appl. No.: 17/779,802

(22) PCT Filed: Nov. 24, 2020

(86) PCT No.: PCT/FR2020/052153
§ 371 (c)(1),
(2) Date: May 25, 2022

(87) PCT Pub. No.: WO2021/105602
PCT Pub. Date: Jun. 3, 2021

(65) Prior Publication Data
US 2023/0051293 A1 Feb. 16, 2023

(30) Foreign Application Priority Data

Nov. 25, 2019 (FR) ........................................ 1913146

(51) Int. Cl.
*B62D 55/24* (2006.01)
(52) U.S. Cl.
CPC .................................. *B62D 55/244* (2013.01)
(58) Field of Classification Search
CPC .............................. B62D 55/244; B62D 55/26
See application file for complete search history.

(56) References Cited

U.S. PATENT DOCUMENTS

| | | | | |
|---|---|---|---|---|
| 5,632,537 A | * | 5/1997 | Yoshimura | B62D 55/244 305/184 |
| 6,065,818 A | * | 5/2000 | Fischer | B62D 55/26 305/191 |

(Continued)

FOREIGN PATENT DOCUMENTS

| | | |
|---|---|---|
| DE | 2020672 A1 | 11/1971 |
| EP | 1197515 A1 | 4/2002 |

(Continued)

OTHER PUBLICATIONS

"Gummiketten in HD—Qualität ion LIS—Baumaschien Wartung, Reparatur & Diagnose—Baumaschienen & Bau Forum—Bauforum24", Apr. 15, 2009, pp. 1-4.

(Continued)

*Primary Examiner* — Kip T Kotter
(74) *Attorney, Agent, or Firm* — VENABLE LLP

(57) ABSTRACT

A rubber caterpillar track (1) has an interior surface (5) intended to collaborate with drive means, and a tread (2) comprising a tread pattern (21) formed of N relief elements made of an elastomeric material which are intended to come into contact with the ground in order to give the caterpillar track (1) traction, each element of the tread pattern (21) comprising a leading face (212) intended to transmit force, characterized in that: a. the leading face of n tread pattern elements, the number n being at least equal to 0.2×N, is inclined with respect to a direction (OZ) normal to the bearing surface by an angle α comprised between 45 degrees and 75 degrees; and b. the tread is notably made of an elastomeric material of which the shore A hardness, measured in accordance with the standard ASTM D2240, is greater than or equal to 65.

7 Claims, 7 Drawing Sheets

(56) References Cited

U.S. PATENT DOCUMENTS

| | | | |
|---|---|---|---|
| 6,068,354 A * | 5/2000 | Akiyama | B62D 55/24 |
| | | | 305/178 |
| 9,932,077 B2 | 4/2018 | Sughihara | |
| 2017/0029048 A1* | 2/2017 | Sugihara | B62D 55/24 |
| 2018/0086152 A1* | 3/2018 | Hibino | B60C 11/0302 |

FOREIGN PATENT DOCUMENTS

| | | | | |
|---|---|---|---|---|
| EP | 3133000 A1 | | 2/2017 | |
| GB | 2048800 A | * | 12/1980 | B60C 11/02 |
| WO | WO-9104145 A1 | * | 4/1991 | |
| WO | 00/01570 A1 | | 1/2000 | |

OTHER PUBLICATIONS

International Search Report dated Jan. 26, 2021, in corresponding PCT/FR2020/052153 (5 pages).

* cited by examiner

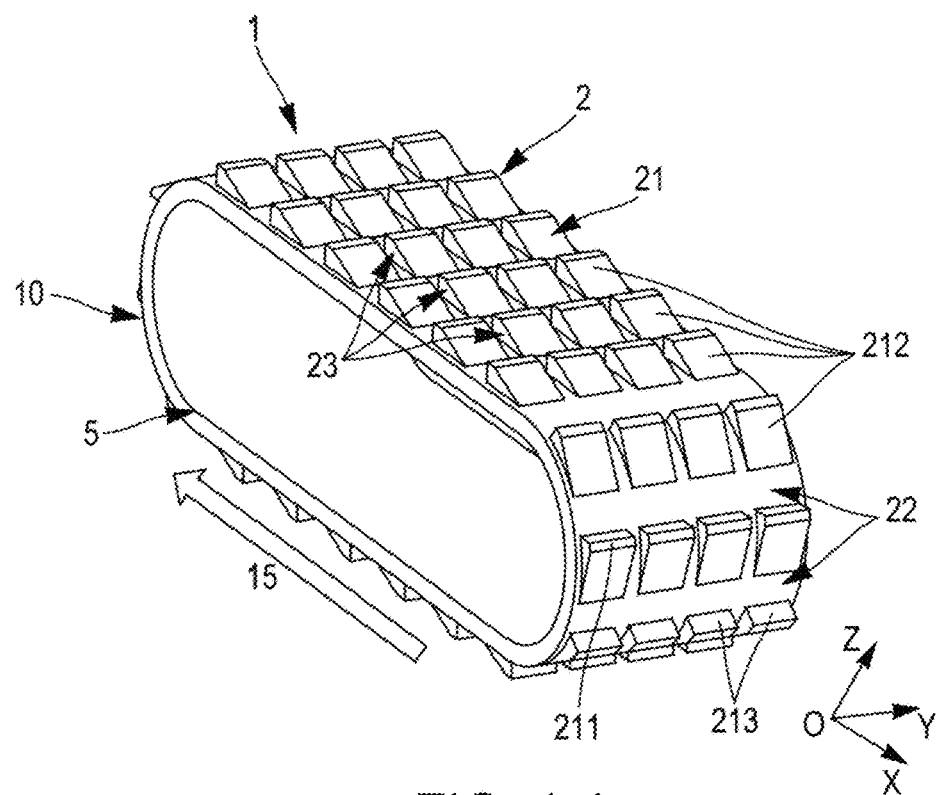
FIG. 1-A
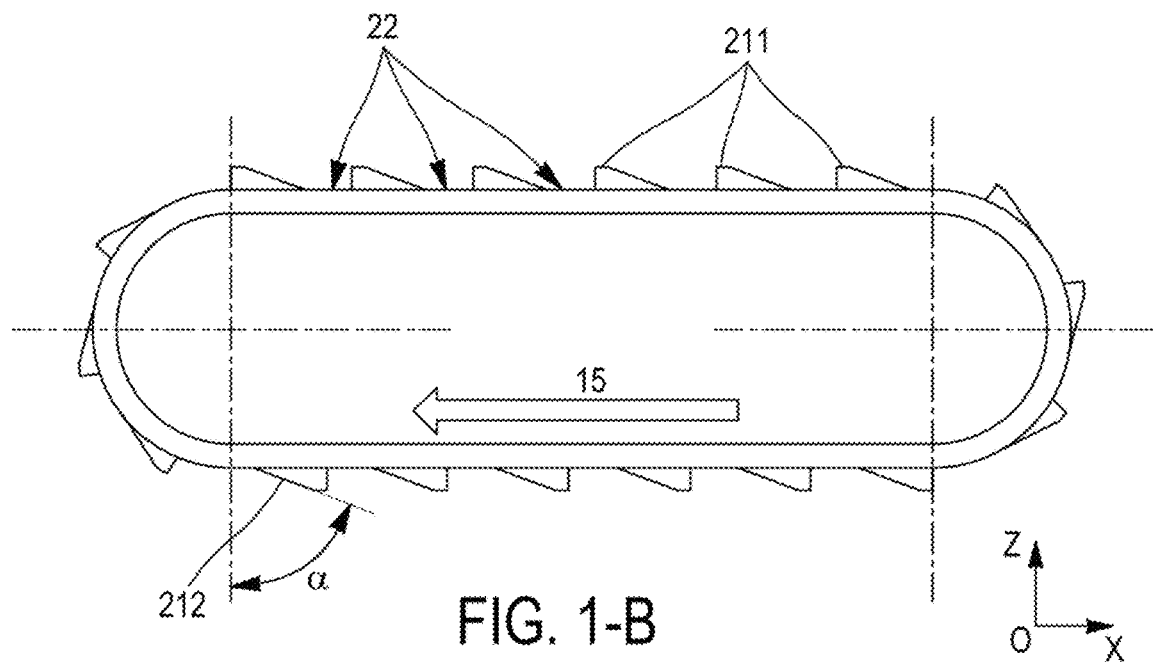
FIG. 1-B

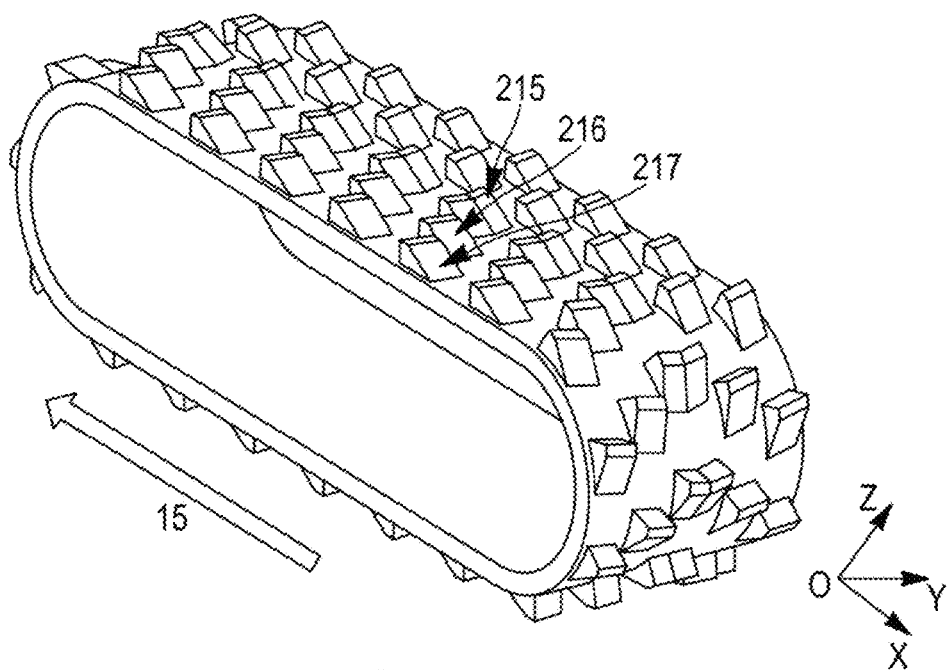
FIG. 2-A
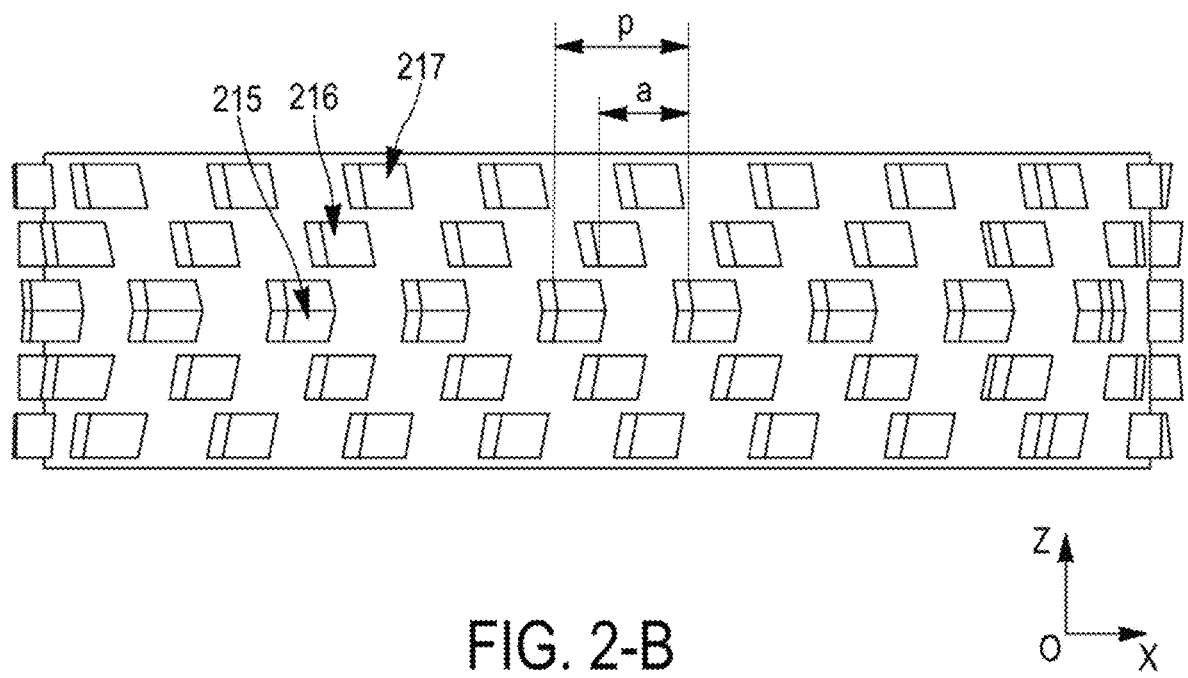
FIG. 2-B

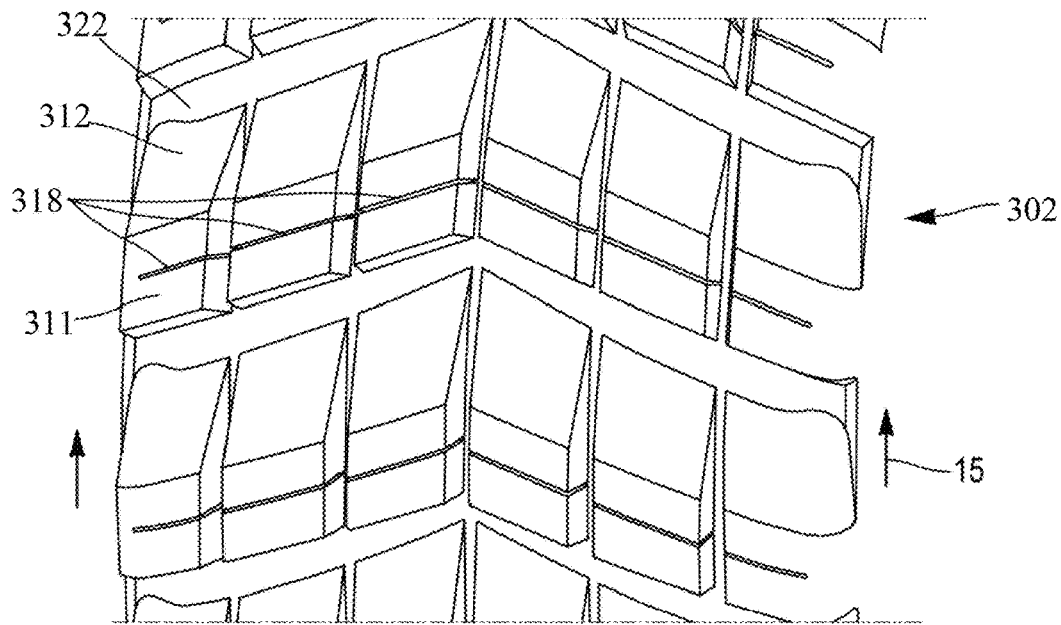
FIG. 3
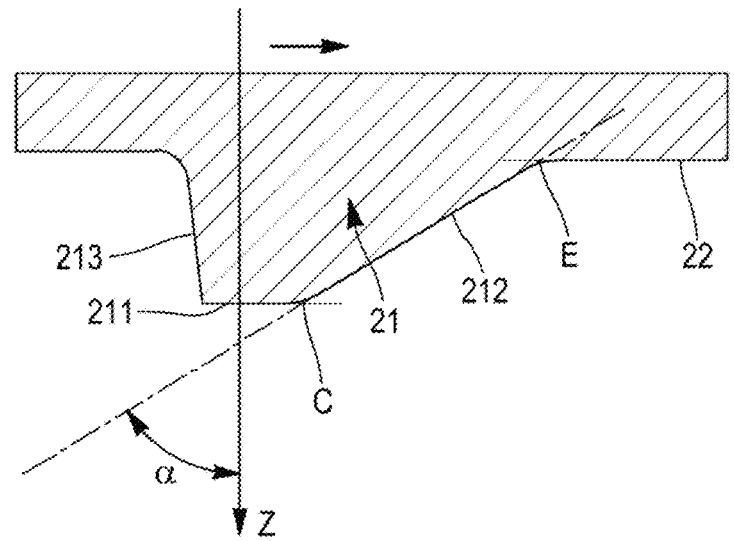
FIG. 4-A
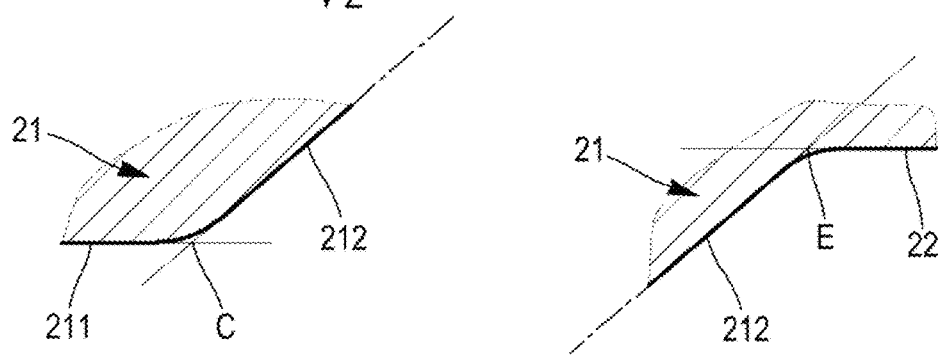
FIG. 4-B  FIG. 4-C

TREAD OF A VEHICLE TRACK

FIELD OF THE INVENTION

The present invention relates to rubber caterpillar tracks of vehicles, and more particularly rubber caterpillar tracks for agricultural, construction plant, or military vehicles with improved traction over loose ground, and particularly relates to treads for caterpillar tracks made of rubber.

The invention will be more particularly described with reference to a multipurpose vehicle, that is to say a vehicle that can be driven both in the fields on loose ground and on roads, such as an agricultural tractor.

What is meant by rubber or rubbery material or rubber compound is any elastomeric material containing at least an elastomer that may be reinforced by at least a reinforcing filler such as carbon black for example.

A tread for a caterpillar track made of rubber for a vehicle notably comprises:

a. a tread, containing rubber and a reinforcement, forming a closed loop in a longitudinal direction having a given width in a transverse direction and having an interior surface intended to collaborate with drive means for driving the caterpillar track, and an exterior surface intended to come into contact with the ground, b. a plurality of relief elements, hereinafter referred to as tread pattern blocks or, more simply, as blocks, which are intended to come into contact with the ground in order to give the vehicle equipped with this caterpillar track good traction, and which extend outwards from a bearing surface as far as the exterior surface, c. a plurality of teeth, extending from the interior surface towards the inside of the caterpillar track and intended at least for guiding this caterpillar track, or any other device which performs the role of transmitting caterpillar track drive force, the drive being performed by means such as at least one wheel positioned on the inside of the caterpillar track.

Given the forces to which a caterpillar track mounted on a vehicle is subjected, it is known practice to provide, within the tread, at least one reinforcement providing the caterpillar track with dimensional stability in the longitudinal direction that corresponds to the direction of the loop formed by said caterpillar track. This reinforcement is generally made up of a plurality of cords laid in the longitudinal direction or else a cord wound at a relatively shallow angle to said direction so as to confer upon the tread a suitable tensile stiffness in the longitudinal direction to allow it to withstand the forces to which it is subjected during use. It is also commonplace to envisage adding an additional reinforcement comprising a superposition of plies each one formed of a plurality of reinforcing filaments or cords laid parallel to one another and possibly criss-crossing from one layer to another.

The ability of the caterpillar track to transmit the rotational energy of the transmission to the ground is very closely dependent on the tread pattern of the tread situated on the exterior face in contact with the ground. A caterpillar track must not slip, which is to say must not slide without advancing through loss of traction. Hence, the tread pattern is generally provided with raised blocks situated on the exterior face of the tread and separated from one another by cuts.

The tread of the caterpillar track is intended to run on various types of ground such as the more or less compact soil of the fields, unmade tracks providing access to the fields, and the tarmacked surfaces of roads. Bearing in mind the diversity of use, in the fields and on the road, the tread of the caterpillar track needs to offer a performance compromise between traction in the field, resistance to chunking, resistance to wear on the road, rolling resistance, and vibrational comfort on the road.

DEFINITIONS

Associated with the caterpillar track is an overall frame of reference (O, X, Y, Z) in which O is the geometric centre of the caterpillar track, the axis (OY) is the axis of rotation of the wheel that drives the caterpillar track, the axis (OX) is perpendicular to (OY) and orientated in the direction of the greatest dimension or length of the caterpillar track, and finally the axis (OZ) is orthogonal to the plane formed by the axes (OX) and (OY).

A transverse direction means a direction parallel to the axis (OY) of rotation of the caterpillar track.

A longitudinal direction (OX) means a direction oriented along the greatest length of the caterpillar track in the direction of running.

A vertical direction means, in the present document, any direction that is perpendicular to the axis of rotation of the wheel that drives the caterpillar track and to the longitudinal axis. This direction corresponds to the direction of the thickness of the tread and is generally referenced (OZ).

A direction that is normal means the direction perpendicular to the exterior surface and oriented towards the outside of the caterpillar track.

A "sipe" means a cut that generates opposing walls of material. The distance between the walls of material of the sipe is suitable for allowing these walls to come at least partially into contact with one another as they enter the contact patch in contact with the ground.

A "groove" means a cut that generates opposing walls of material. The distance between the walls of material of the groove is such that these walls cannot come into contact with one another under usual running conditions.

The tread pattern elements of the tread are volume elements that are in raised relief with respect to the bearing surface, and also referred to as "blocks" and comprise a leading face, a contact face and a trailing face.

By way of example, in the case of tread pattern elements comprising two rows of blocks of the V-configured or chevron-configured lug type, the caterpillar track has a preferred direction of rotation according to the point of the chevrons. The leading face is, by definition, the face of which the edge corner directed outward in the normal direction, or leading edge corner, is first to come into contact with the ground when the lug enters the contact patch in which the caterpillar track is in contact with the ground, as the caterpillar track rotates. The trailing face is, by definition, the face of which the edge corner directed outward in the normal direction, or trailing edge corner, is last to come into contact with the ground when the lug enters the contact patch in which the caterpillar track is in contact with the ground, as the caterpillar track rotates. In the direction of rotation, the leading face is said to be forward of the trailing face.

The voids volume ratio of the tread pattern of the tread is defined as being the ratio between the total volume of the grooves that separate the raised elements and the total volume of the tread assumed to be free of voids, comprised between the bottom surface and the tread surface. The voids volume ratio thus implicitly defines the volume of elastomer material of which the tread is made that is intended to become worn. It also has a direct impact on the contact patch over which the tread is in contact with the ground and, therefore, on the contact pressures for contact with the ground, both of which govern caterpillar-track tread wear.

The "level of wear" of the tread means the ratio between a thickness that the tread has lost through wear and the total thickness that the tread is able to lose before it has to be replaced. Thus, a 25% level of wear means that the tread has lost one quarter of the thickness of rubbery material that can be worn away.

The "tread surface" of a tread here means the set of points of the tread that come into contact with the ground when the caterpillar track is running on this ground.

The "voids area ratio" of a tread means the ratio of voids present on the tread surface of this tread. This voids area ratio is notably generated by the grooves of the tread.

The voids area ratio is closely connected with the grip of the tread with the ground. Said ratio determines the surface area of rubber in contact with the ground in order to provide the grip required to cause the vehicle to advance by transmitting motive torque.

A lack of grip results in the tread of the caterpillar track slipping, which means the caterpillar track turning without supplying sufficient traction.

The level of slip, as a percentage (%), corresponds to the ratio between the actual speed minus the theoretical speed, divided by the actual speed. In other words, the level of slip is equal to $(V_{actual} - V_{theoretical})/V_{actual}$. The amount of traction with respect to the level of slip is an indication of the performance of the tread pattern.

The hardness of an elastomeric compound after curing, such as the one involved in the composition of the tread, is one of the mechanical data points used for characterizing this. The Shore A hardness is measured in accordance with the standard ASTM 2240 using a durometer instrument and is indicative of the ability of the elastomeric compound to resist the penetration of an indentor. The stiffer the compound, the higher the Shore A hardness. In order to design a rubber caterpillar track, the elastomeric compound is selected with consideration to, amongst others, the Shore A hardness which needs to be suitable for the tread pattern of the exterior surface in order to withstand scratching and tearing, given the diversity of the use of the vehicle.

In order to compare the traction performance of tread patterns of caterpillar tracks it is possible to conduct compression-shear tests in a laboratory on test specimens equipped with said tread pattern, on previously compacted loose ground. The result of the test demonstrates how the traction changes with respect to the level of slip of the test specimen.

The shear-compression test conducted on the test specimens on previously compacted loose ground involves three steps:

i. a first step of compacting the previously-expanded soil in a tray. The compaction is performed at a pressure of 0.7 bar;

ii. a static load is applied to the test specimen by applying weights;

iii. the test specimen is made to move, beginning with an acceleration phase at 0.5 m/s$^2$, followed by a steady-state phase at a speed adjustable from 1 to 100 mm/s.

The postprocessing of the measurement result allows the tread patterns to be classified just as a traction test under actual conditions would, providing access to the traction potential of the tread pattern as a function of slip.

PRIOR ART

Treads for caterpillar tracks for agricultural or construction plant vehicles conventionally comprise elongate blocks referred to as lugs which extend from the centre of the tread towards the shoulders. These lugs are disposed on both sides of the transverse median plane, such as to form a pattern in the form of a "V", with the point of the V-pattern (or chevron pattern) being designed to first to enter the contact patch which is the area of contact with the ground. The lugs are spaced apart from one another so as to form furrows or grooves; the width of these furrows is determined so as to allow good operation both on the road and on loose ground. The lugs exhibit symmetry with respect to the transverse median plane of the tread, usually with an offset between the two rows of lugs, similar to that obtained by one half of the tread being rotated about the axis of the caterpillar track with respect to the other half of the tread. Moreover, the lugs may be continuous or discontinuous, and may be distributed longitudinally with a pitch spacing that is constant or variable. The lugs have a contact face intended to run on firm ground, such as, for example, the roads taken to reach the vicinity of the fields, and a leading face intended to transmit the driving force when the agricultural vehicle is travelling over loose ground, typically the soil in the fields.

A recurring dissatisfaction relates to the traction performance of the known treads on loose ground. The productivity of vehicles, such as that of agricultural vehicles for example, is directly linked to the traction capability thereof on loose ground. Improving this performance would allow the user not only to improve the efficiency of their equipment but also to reduce their operating costs, for example by reducing the fuel consumption per unit of area covered. Of course, the improvement in traction should not be at the expense of other performance aspects such as for example wear resistance, comfort and the possibility of running at a sufficiently high speed on the road.

SUMMARY OF THE INVENTION

According to the invention, this objective is achieved by a rubber caterpillar track forming a closed loop in a longitudinal direction (OX) having a given width in a transverse direction (OY) and having an interior surface intended to collaborate with drive means, and a tread of which the exterior surface is intended to come into contact with the ground, said tread comprising a tread pattern formed of N relief elements made of an elastomeric material which are intended to come into contact with the ground in order to give the caterpillar track traction, each element of said tread pattern extending outwards from a bearing surface as far as the exterior surface and comprising a contact face intended to be in contact with the ground and a leading face intended to transmit force:

a. said leading face of n tread pattern elements, the number n being at least equal to 0.2×N, is inclined by an angle α comprised between 45 degrees and 75 degrees with respect to a direction (OZ) normal to the bearing surface;

b. the tread is made of an elastomeric material of which the shore A hardness, measured in accordance with the standard ASTM D2240, is greater than or equal to 65.

The principle of the invention is to have a caterpillar-track tread pattern that is multifunctional in recognition of the fact that the vehicle is used both on loose ground and on made-up roads. On loose ground, in order to obtain good traction and therefore optimal power transfer the tread pattern blocks need to be able to bear on the ground over their entire height without slipping. According to the invention, if at least 20% of the tread pattern blocks have a leading face that is inclined with respect to the normal direction (OZ) by an angle α comprised between 45 degrees and 75 degrees, then the traction of the vehicle is markedly improved.

Again according to the invention, the tread is made of an elastomeric material of which the shore A hardness, measured in accordance with the standard ASTM D2240, is greater than or equal to 65.

The rubber tread pattern blocks need to be stiff enough to bite into the ground without bending in order to transmit force. Furthermore, the tread pattern blocks need to be resistant to scratching and, in general, to all forms of attack from the environment when the vehicle is being used. For that reason, the Shore A hardness needs to be at a suitable level of at least 65 according to the invention.

Preferably, the angle $\alpha$ is between 55 degrees and 65 degrees.

Also preferably, the number n is at least equal to 0.4×N.

Also preferably, the leading face is made up mainly of two surfaces, a first surface being adjacent to the contact face and a second surface being adjacent to the bearing surface, the angle of inclination $\alpha$ being that of the linear regression line of the profile of the leading face, the first surface forming an angle $\alpha_1$ with the vertical direction Z, $\alpha_1$ being greater than $\alpha$ and between 45° and 75°, a height h of the first surface being at least equal to one third of the height H of the tread pattern block.

Preferably, the tread pattern blocks have a quadrilateral base and form, between one another, rows that are inclined with respect to the transverse direction.

According to a first variant, the tread pattern blocks within each row are disposed such that their leading faces are aligned with one another.

According to a second variant, the tread pattern blocks within each row are disposed such that the leading faces of adjacent blocks are offset with respect to one another in the longitudinal direction.

In this second variant, the tread pattern blocks within each row are preferably disposed such that, starting from the most central block of the tread, the front edge corners of the successively adjacent blocks are offset in the longitudinal direction and in the opposite direction to the direction of running by an offset "a" of between 45% and 65% of the pitch spacing "p" of the tread pattern.

In a third variant, the tread pattern blocks also have transverse sipes.

In a fourth variant of the invention, the tread pattern elements of the exterior surface that is intended to come into contact with the ground are lugs with a leading face which extends across the entire transverse width of the caterpillar track.

Still according to the fourth variant of the invention, the tread pattern elements of the tread are curved lugs distributed in the longitudinal direction (OX) in two rows that are symmetrical with respect to the transverse plane (XOZ), said lugs being inclined with respect to the direction (OX) so as to form chevron patterns oriented towards the centre of the tread of the caterpillar track.

Further features and advantages of the invention will become apparent from the following description given with reference to the appended drawing which shows, by way of non-limiting example, an embodiment of the subject matter of the invention.

BRIEF DESCRIPTION OF THE FIGURES

FIGS. 1-A, and 1-B, depict a first embodiment of the invention. The tread pattern of the tread is made up of aligned blocks. FIG. 1-A is a perspective view, and 1-B is a view in the transverse plane (OXZ).

FIGS. 2-A and 2-B depict a second embodiment of the invention in a perspective view 2-A, and in a view 2-B in the plane of contact with the ground (XOY).

FIG. 3 is a partial perspective view showing a detail of a tread according to a third embodiment of the invention.

FIGS. 4-A to 4-C are schematic detail views of the profile of a tread pattern block of the tread of the invention.

DETAILED DESCRIPTION

Figure 5:
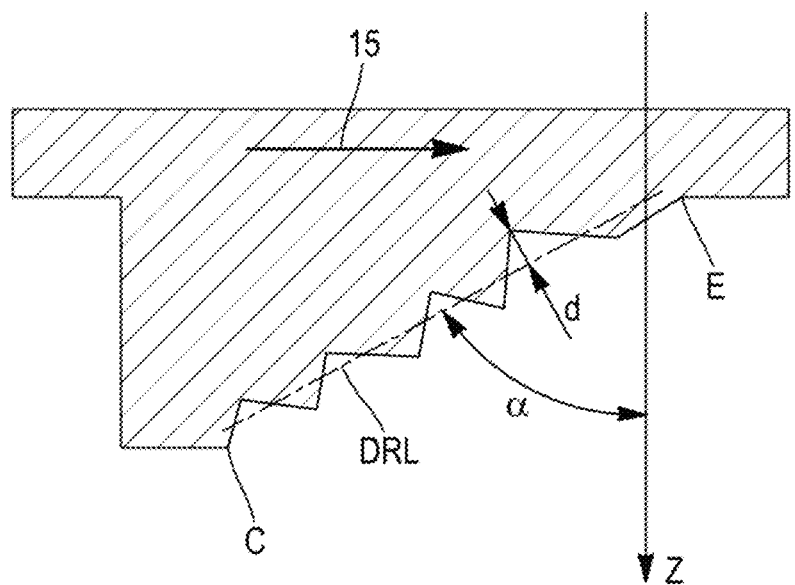
FIGS. 5 to 7 are schematic views of further examples of profiles of a tread pattern block of the tread of the invention.

FIGS. 1-A and 1-B depict a rubber caterpillar track denoted by the general reference 1, comprising a tread 2, forming a closed loop in a longitudinal direction (OX), with a given width in a transverse direction (OY), having an interior surface 5 and an exterior surface 10. Said tread 1 is provided with a tread pattern 21 made up of a plurality of raised elements intended to come into contact with the ground to provide good traction to the vehicle equipped with this caterpillar track 1 of which the preferred direction of running is indicated by the arrow 15.

Each element of said tread pattern 21 extends outwards from a bearing surface 22 and comprises a contact face 211, intended to be in contact with the ground, a leading face 212, intended to transmit the motive torque from the vehicle during running, said leading face 212 being inclined, with respect to the direction normal to the bearing surface 22, by an angle $\alpha$ comprised between 45 degrees and 75 degrees.

In FIG. 1-A, the tread pattern 21 of the tread 1 comprises in total a number "N" of blocks separated from one another by longitudinal cuts 23. Each block has in particular a contact face 211, a leading face 212 and a trailing face 213. The contact face is the face at the crown of the block that is intended to run and to bear the load on firm ground. On loose ground, the blocks can sink into the ground. In the preferred direction of running of the caterpillar track, the leading face 212 is thus the face that is the first to enter the contact patch and can transmit a driving force, while the trailing face is the face that is the last to leave the contact patch. The trailing face 213 can only transmit force to the ground during a braking or reversing phase.

FIG. 1-B is a depiction of the cross section of the caterpillar track in the plane (OXZ). The geometric centre of the caterpillar track is indicated by the reference 3. This view makes it possible to clearly see the orientation of the leading faces of the blocks. The leading faces are inclined backwards with respect to the direction normal to the bottom surface 22 according to the preferred direction of running indicated by the arrow 15 and make an angle $\alpha$ with this normal direction. According to the invention, the angle $\alpha$ is between 45° and 75°. In this example, the angle $\alpha$ is 60°.

In this first embodiment, all of the blocks of the tread 2 have leading faces inclined at an angle $\alpha$ of between 45° and 75°, meaning that the number n of blocks that comply with this inclination characteristic of their leading face is equal to N. However, the invention can also be implemented when only some of the tread pattern blocks of the tread comply with this inclination characteristic. For example, when the number n of these blocks is at least equal to 0.2×N, that is to say when at least 20% of the blocks comply with this inclination characteristic of their leading face, the benefit in terms of traction on loose ground is already substantial.

Still in this first embodiment, the blocks are disposed across the width of the tread in a four-block pattern. Within each row, the blocks are disposed such that their leading faces are aligned with one another, meaning that together they are almost continuous, only being interrupted by the cuts 23. The tread shown here is perfectly symmetric with respect to the median transverse plane of the caterpillar track. In a variant that is not shown, the patterns of the two halves of the tread that are situated on either side of the median transverse plane can, by contrast, be offset with respect to one another in the longitudinal direction, as is often the case for lug tread patterns of prior art agricultural tyres.

FIGS. 2-A and 2-B depict a second embodiment of a tread according to the invention. The blocks are disposed across the width of the tread in a five-block pattern. The central blocks 215 have a dual leading face, each part of this dual leading face complying with the inclination characteristic set out above. The other blocks are similar to those in the previous embodiment and likewise comply with the inclination described with an angle α close to 60°.

In this second embodiment, the disposition of the blocks differs from that of the first embodiment mainly in that the blocks are no longer aligned within each row but rather are disposed such that the leading faces of adjacent blocks are offset with respect to one another in the longitudinal direction. One way of characterizing this offset is best visible in the view of FIG. 2-B. Looking at the pitch spacing "p" between two successive patterns, the intermediate block 216 adjacent to a central block 215 and which in the direction of running of the caterpillar track enters the contact patch after this central block is offset by a distance "a" in the opposite direction to the direction of running (arrows 15). As a preference, this offset "a" is comprised between 45% and 65% of the pitch spacing "p". As depicted in FIG. 2-B, the distance "p" between two blocks is measured between the front edge corner of the most central block (the edge corner being defined by the intersection of the leading face and the contact face) and the front edge corner of the adjacent block which, in the rolling direction of the tyre, enters the contact patch after said central block. The same measurement principle applies for each successively adjacent block and for the two sides of the tread. A similar offset is thus also observed between the intermediate block 216 and the shoulder block 217. Since the tread pattern is in this case symmetric with respect to the equatorial mid-plane of the caterpillar track, the same rule applies for the two sides of the tread.

FIG. 3 depicts a third embodiment of the invention, in which the blocks also have transverse sipes 318. Similar sipes are of course compatible with other embodiments of the invention. Elements of FIG. 3 with reference numerals in the 300-series are the same or similar to those corresponding elements in FIGS. 1-A and 1-B, with otherwise identical reference numerals in the 000-series (e.g., 2 or 23) or the 200-series, and a detailed description of such elements may be omitted here.

FIGS. 4-A to 4-C show, on a larger scale, an example of a block profile in which the leading face 212 is connected to the contact face 211 and to the bearing surface 22 by fillets. A point C is defined at the intersection of the continuations of the leading face and of the contact face and a point E is defined at the intersection of the continuations of the leading face 212 and of the bearing surface 22. The angle of inclination α of the leading face is thus the angle that the straight line passing through C and E makes with the direction normal to the bearing surface 22.

Figure 6:
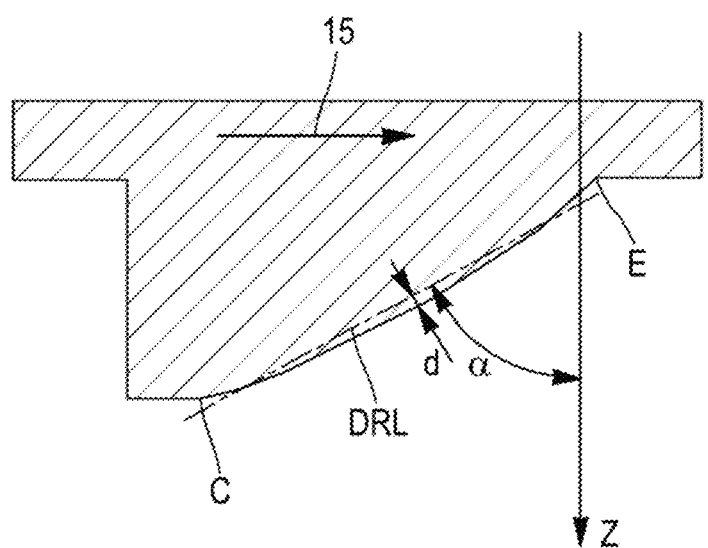
Figure 7:
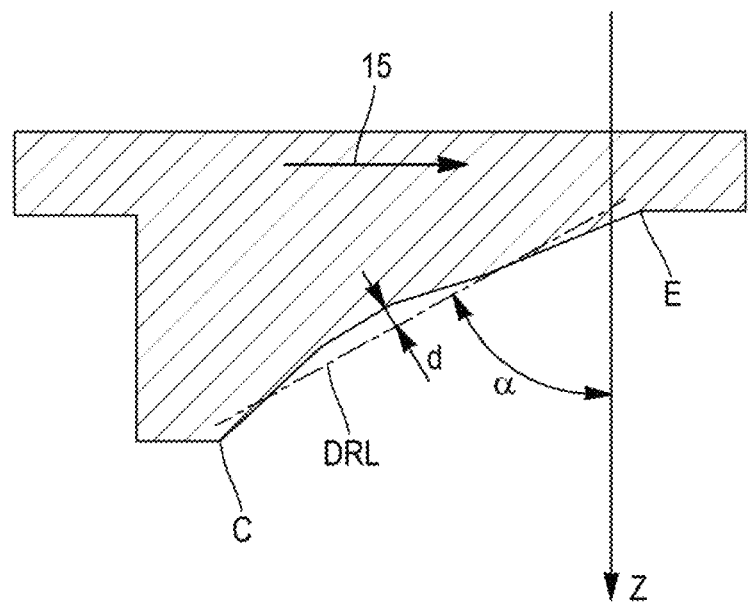

FIGS. 5, 6 and 7 show examples of cases in which a leading face, similar to the leading face 212, is not flat. In this case, the angle of inclination α of the linear regression line DRL of the profile of the leading face between the points C and E at which the leading face meets the contact face 211 and the bearing surface 22, respectively, will be considered. Preferably, the distance d between the profile and the linear regression line DRL thereof remains less than 15 mm. FIG. 5 depicts a so-called sawtooth profile for the leading face.

Figure 8:
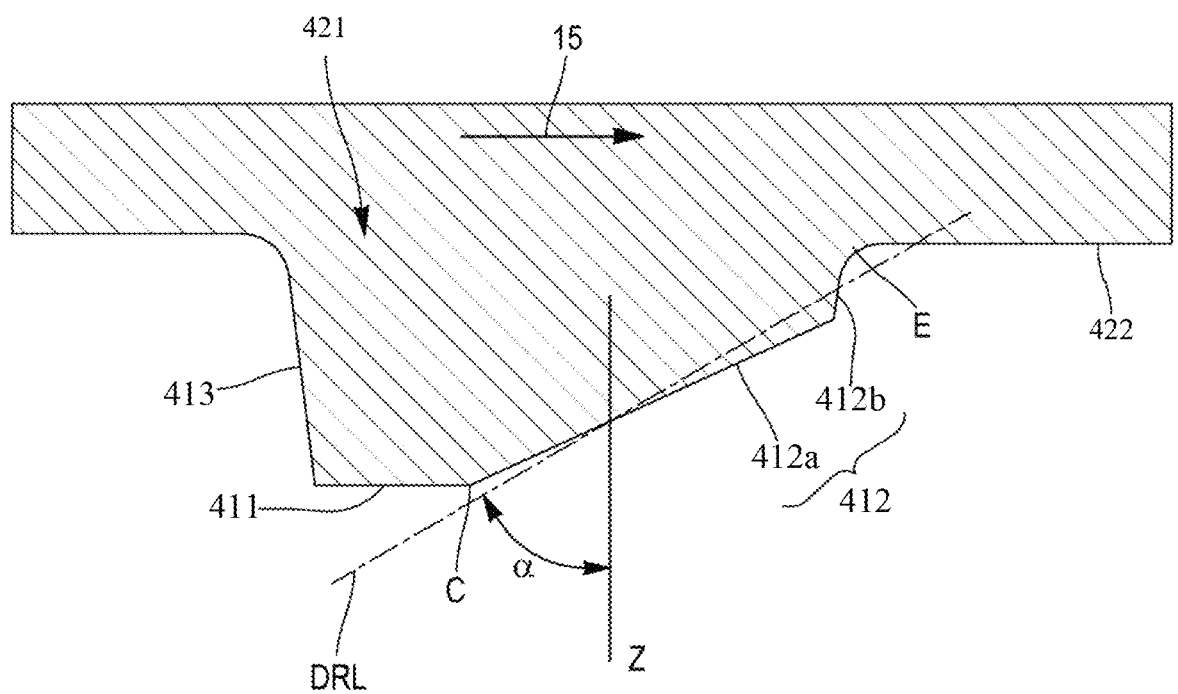
FIGS. 8 and 9 are schematic views of further examples of profiles of a tread pattern block of the tread of the invention.
Figure 9:
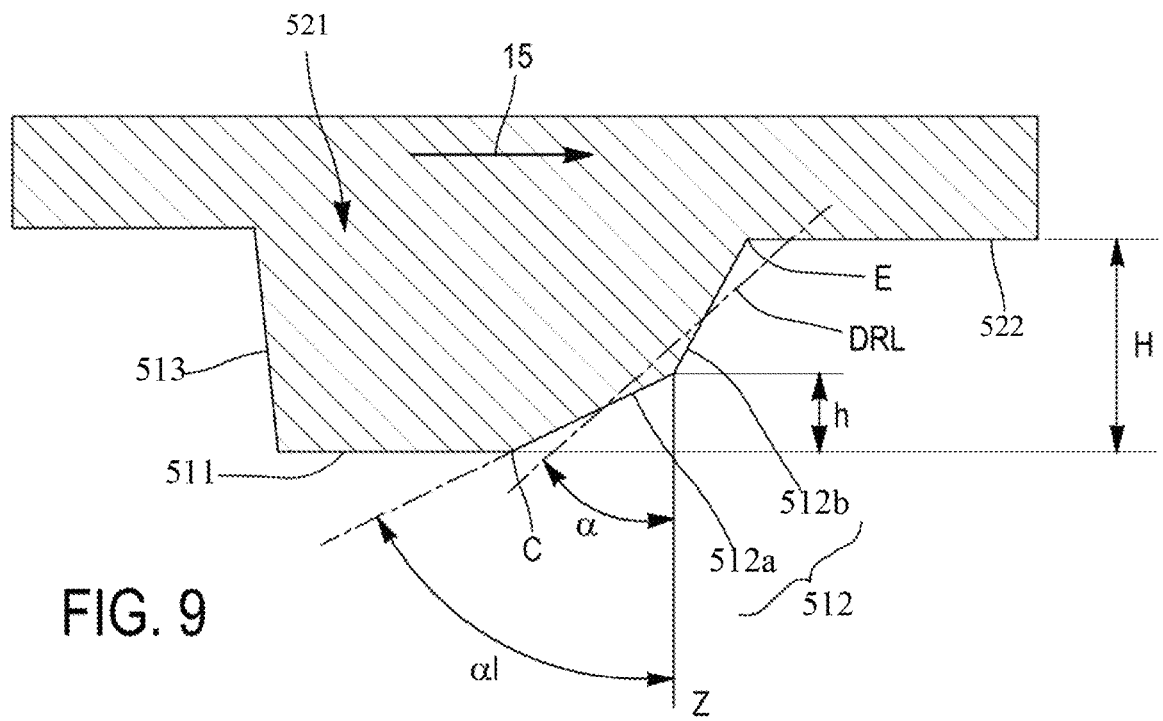

FIGS. 8 and 9 show cases in which the leading face 412 and 512 is made up mainly of two surfaces, a first surface 412a and 512a adjacent to the contact face 411 and 511 and a second surface 412b and 512b adjacent to the bearing surface 422 and 522. Elements of FIGS. 8 and 9 with reference numerals in the 400-series or the 500-series are the same or similar to those corresponding elements in FIGS. 1-A and 1-B, with otherwise identical reference numerals in the 000-series (e.g., 2 or 23) or the 200-series, and a detailed description of such elements may be omitted here. As explained above for FIGS. 5 to 7, the angle of inclination α is that of the linear regression line DRL of the profile of the leading face between the points C and E where the first surface 412a and 512a meets the contact face 411 and 511 and the second surface 412b and 512b meets the bearing surface 422 and 522, respectively. The angle α is between 45° and 75°, and preferably between 55° and 70°. The first surface 412a and 512a itself makes an angle $α_1$ with the direction normal to the bearing surface 422 and 522. This angle $α_1$ is greater than α while likewise remaining comprised between 45° and 75°. The vertical height h of the first surface 412a and 512a in the thickness direction of the caterpillar track represents at least one third of the height of the tread pattern block H.

Figure 10:
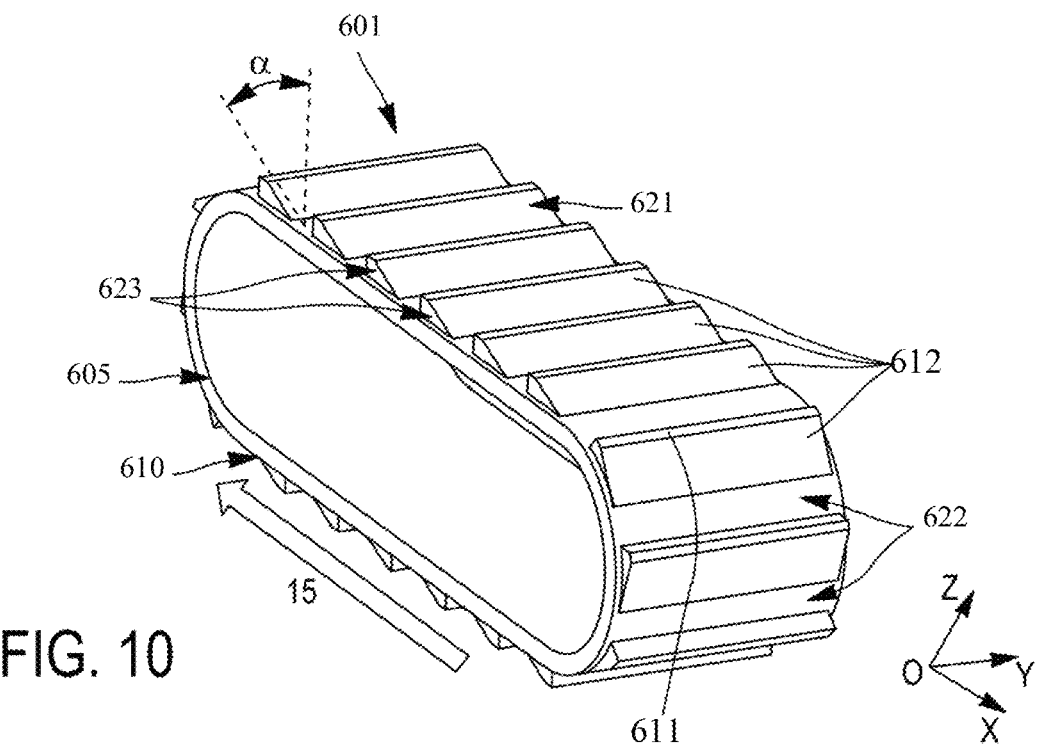
FIG. 10 depicts a perspective view of a caterpillar-track tread made up of transverse lugs.

FIG. 10 depicts a simplified embodiment of the invention in which the blocks are in actual fact lugs extending across the entire transverse width of the tread 601. Elements of FIG. 10 with reference numerals in the 600-series are the same or similar to those corresponding elements in FIGS. 1-A and 1-B, with otherwise identical reference numerals in the 000-series (e.g., 2 or 23) or the 200-series, and a detailed description of such elements may be omitted here.

Figure 11:
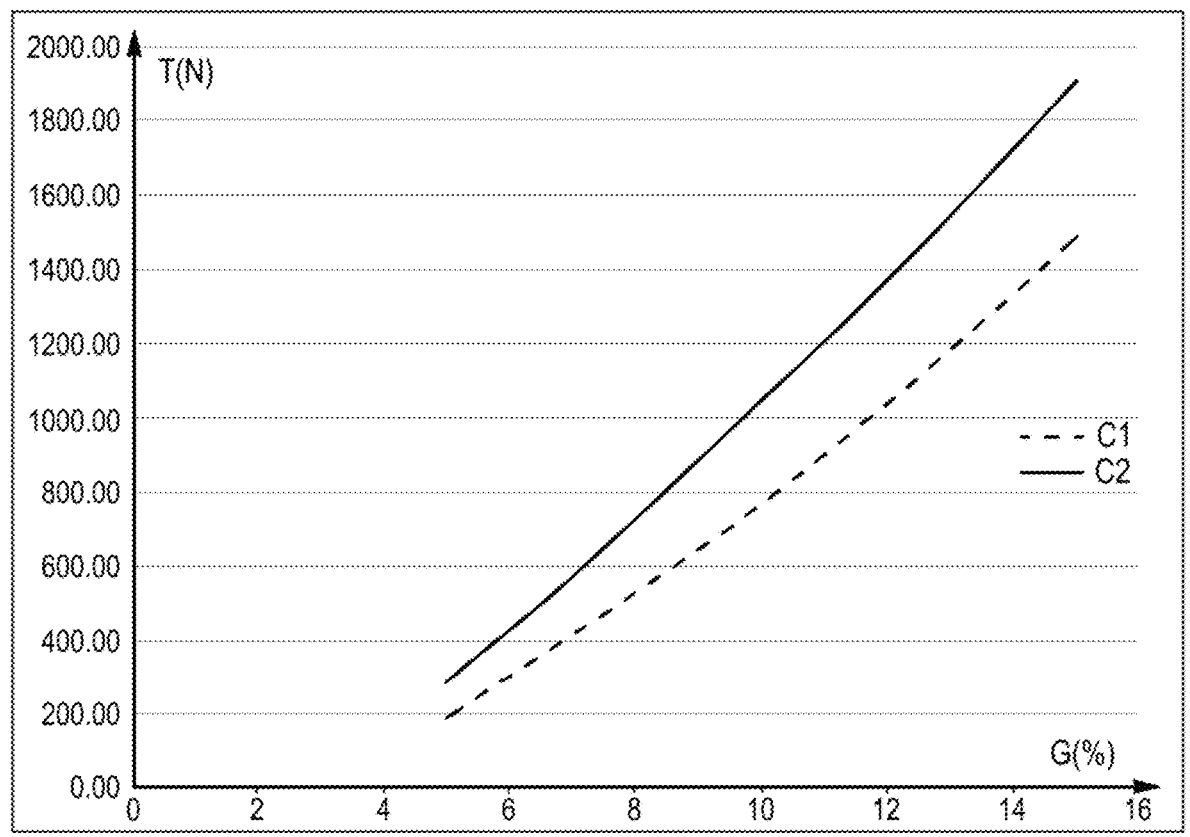
FIG. 11 depicts performance results for two embodiments of the invention in comparison with the prior art.

The traction versus slip performance as defined above was evaluated on test specimens indicative of the embodiment with lugs, as illustrated in FIG. 10, and of the embodiment as depicted in FIG. 5 having a so-called sawtooth tread pattern. These tread patterns according to the invention were compared with a lugged tread pattern of the prior art. FIG. 11 depicts the two results curves C1 and C2. Curve C1 in discontinuous line with broad strokes corresponds to the results of the prior art, and curve C2 in discontinuous line with closely spaced strokes represents the results for the tread pattern of the embodiment of FIG. 10. The abscissa axis represents the level of slip G as a %, and the ordinate axis represents the traction in newtons T (N). The results show that upwards of 5% slip, the lugged tread pattern according to the embodiment of FIG. 10 of the invention performs 51% better than the tread pattern of the prior art. The improvement still being by 28% at 15% slip.

According to the inventors, a tread pattern voids volume ratio of the tread greater than or equal to 30% guarantees the invention good functionality. Likewise, a voids area ratio lower than 70% makes it possible to obtain optimal grip on made-up (asphalted) roads.

The invention is not intended to be limited to just these described exemplary embodiments, and various modifications can be made thereto while remaining within the scope as defined by the claims.

The invention claimed is:

1. A rubber caterpillar track forming a closed loop in a longitudinal direction (OX) having a given width in a transverse direction (OY), having a longitudinal centerline, and having an interior surface intended to collaborate with drive means, and a tread of which an exterior surface is intended to come into contact with a ground, the tread comprising a tread pattern formed of a plurality of tread pattern blocks made of an elastomeric material which are intended to come into contact with the ground in order to give the caterpillar track traction, there being N tread pattern blocks in the plurality of tread pattern blocks, each tread pattern block having a quadrilateral base and extending outward from a bearing surface as far as the exterior surface and comprising a contact face intended to be in contact with the ground and a leading face intended to transmit force, wherein the tread pattern blocks are arranged in a plurality of transverse rows, each transverse row of the plurality of transverse rows having a central tread pattern block and two or more tread pattern blocks on either side of the longitudinal centerline, the tread pattern blocks within each row are disposed such that, starting from the central tread pattern block, front edge corners of successively adjacent blocks are offset with respect to one another in the longitudinal direction (OX) and in a direction opposite to a direction of running, wherein the leading face of n tread pattern blocks of the plurality of tread pattern blocks is inclined by an angle $\alpha$ between 45 degrees and 75 degrees with respect to a direction (OZ) normal to the bearing surface, n being greater than or equal to 0.2×N, and wherein the tread is made of an elastomeric material of which a shore A hardness, measured in accordance with standard ASTM D2240, is greater than or equal to 65.

2. The rubber caterpillar track according to claim 1, wherein the angle $\alpha$ is between 55 degrees and 70 degrees.

3. The rubber caterpillar track according to claim 1, wherein the n is equal to or greater than 0.4×N.

4. The rubber caterpillar track according to claim 1, wherein the leading face is made up mainly of two surfaces, a first surface being adjacent to the contact face and a second surface being adjacent to the bearing surface, the angle of inclination $\alpha$ being that of a linear regression line (DRL) of a profile of the leading face, the first surface forming an angle $\alpha_1$ with a vertical direction Z, $\alpha_1$ being greater than $\alpha$ and between 45 degrees and 75 degrees, a height h of the first surface being at least equal to one third of a height H of each tread pattern block.

5. The rubber caterpillar track according to claim 1, wherein the two or more tread pattern blocks are offset with respect to one another and the central tread pattern block in the longitudinal direction (OX) in a direction opposite to a direction of running.

6. The rubber caterpillar track according to claim 1, wherein the front edge corners of the successively adjacent blocks are offset by an offset "a" of between 45% and 65% of a pitch spacing "p" of the tread pattern.

7. The rubber caterpillar track according to claim 1, wherein the tread pattern blocks further comprise transverse sipes.

* * * * *